United States Patent
Potteck

(10) Patent No.: US 7,676,305 B2
(45) Date of Patent: Mar. 9, 2010

(54) METHOD AND APPARATUS FOR ASSIGNING WEIGHTING COEFFICIENTS FOR PERFORMING ATTITUDE CALCULATIONS WITH A STAR SENSOR

(75) Inventor: Serge Potteck, Toulouse (FR)

(73) Assignee: Centre National d'Etudes Spatiales (FR)

( * ) Notice: Subject to any disclaimer, the term of this patent is extended or adjusted under 35 U.S.C. 154(b) by 1151 days.

(21) Appl. No.: 10/549,737

(22) PCT Filed: Mar. 19, 2004

(86) PCT No.: PCT/FR2004/000675

§ 371 (c)(1),
(2), (4) Date: Oct. 6, 2005

(87) PCT Pub. No.: WO2004/086079

PCT Pub. Date: Oct. 7, 2004

(65) Prior Publication Data

US 2006/0145052 A1  Jul. 6, 2006

(30) Foreign Application Priority Data

Mar. 20, 2003 (FR) .................. 03 03407

(51) Int. Cl.
*G05D 1/00* (2006.01)
*G05D 3/00* (2006.01)

(52) U.S. Cl. .......... 701/13; 701/226; 244/164; 244/171; 250/203.1; 250/206.1

(58) Field of Classification Search ........ 701/222, 701/13, 226; 250/206.1, 203.1; 244/164, 244/171

See application file for complete search history.

(56) References Cited

U.S. PATENT DOCUMENTS

| | | | |
|---|---|---|---|
| 3,301,508 A * | 1/1967 | Yamron ............ | 244/3.18 |
| 3,310,876 A * | 3/1967 | Yamron ............ | 33/268 |
| 5,577,733 A * | 11/1996 | Downing ........... | 273/348 |
| 5,988,645 A * | 11/1999 | Downing ........... | 273/348 |
| 6,108,594 A * | 8/2000 | Didinsky et al. ...... | 701/13 |
| 6,272,432 B1 * | 8/2001 | Li et al. ............ | 701/222 |
| 6,330,988 B1 * | 12/2001 | Liu et al. ........... | 244/164 |
| 6,362,464 B1 * | 3/2002 | Liu et al. ........... | 250/206.1 |
| 7,415,329 B2 * | 8/2008 | Nowak et al. ........ | 701/13 |
| 2006/0145052 A1 * | 7/2006 | Potteck ............. | 250/203.1 |

FOREIGN PATENT DOCUMENTS

RU  2063663 C1 *  7/1996

OTHER PUBLICATIONS

Track 7: Spacecraft Avionics Systems & Technologies; Aerospace Conference, 2007 IEEE; Mar. 3-10, 2007 pp. 61-70 Digital Object Identifier 10.1109/AERO.2007.352632.*
A Remote Sensing Image Segmentation Method Based on Spectral and Texture Information Fusion; Xing Xie; Mengliang Liu; Leiguang Wang; Qianqin Qin; Information Technology: New Generations, 2009. ITNG '09. Sixth International Conference on Apr. 27-29, 2009 pp. 22-27, Digital Object Identifier 10.1109/ITNG.2009.137.*

(Continued)

*Primary Examiner*—Cuong H Nguyen
(74) *Attorney, Agent, or Firm*—Lerner, David, Littenberg, Krumholz & Mentlik, LLP

(57) ABSTRACT

Methods and apparatus for assigning weighting coefficients to measurements of a succession of stars acquired by a star sensor connected to a client device in order to determine a spatial orientation, characterized in that higher or lower preference is given to refreshment of the positions of measurements with the highest weights and/or stars on which these measurements are made by the star sensor and/or its client device, so as to displace part of the power of the error associated with the set of star measurements within the frequency spectrum.

19 Claims, 4 Drawing Sheets

OTHER PUBLICATIONS

Action snippets: How many frames does human action recognition require?; Schindler, K.; van Gool, L.; Computer Vision and Pattern Recognition, 2008. CVPR 2008. IEEE Conference on; Jun. 23-28, 2008 pp. 1-8; Digital Object Identifier 10.1109/CVPR.2008. 4587730.*

Interfacing sound synthesis to movement for exploring high-dimensional systems in a virtual environment; Insook Choi; Bargar, R.; Systems, Man and Cybernetics, 1995. Intelligent Systems for the 21st Century., IEEE International Conference on; vol. 3, Oct. 22-25, 1995 pp. 2772-2777 vol. 3, Digital Object Identifier 10.1109/ICSMC. 1995.538582.*

F. Dell'Acqua, P. Gamba, A. Ferrari, J. A. Palmason, J. A.; Benediktsson, and K. A. A. K. Arnason, "Exploiting spectral and spatial information in hyperspectral urban data with high resolution," Geoscience and Remote Sensing Letters, IEEE, vol. 1, pp. 322-326, 2004.*

D. Comaniciu and P. Meer, "Mean shift: a robust approach toward feature space analysis," IEEE Transactions on Pattern Analysis and Machine Intelligence, vol. 24, p. 17, 2002.*

Action snippets: How many frames does human action recognition require?; Schindler, K.; van Gool, L.; Computer Vision and Pattern Recognition, 2008. CVPR 2008. IEEE Conference on; Jun. 23-28, 2008 pp. 1-8; Digital Object Identifier 10.1109/CVPR.2008. 4587730.*

Liebe et al., "Active Pixel Sensor (APS) based Star Tracker", IEEE Aerospace Conference Proceedings, XX, XX, vol. 1, pp. 119-127, Mar. 21, 1998.

* cited by examiner

METHOD AND APPARATUS FOR ASSIGNING WEIGHTING COEFFICIENTS FOR PERFORMING ATTITUDE CALCULATIONS WITH A STAR SENSOR

CROSS-REFERENCE TO RELATED APPLICATIONS

The present application is a national phase entry under 35 U.S.C. § 371 of International Application No. PCT/FR04/00675 filed Mar. 19, 2004, published in France, which claims priority from French Application No. 03-03407, Publication No. 2852687 filed Mar. 20, 2003, all of which are incorporated herein by reference.

BACKGROUND OF THE INVENTION

This invention relates to the domain of methods for determining the orientation of objects in space.

More precisely, it relates to a method of assigning weighting coefficients to measurements of a succession of stars acquired by a star sensor in order to determine a spatial orientation.

An increasing number of artificial satellites are orbiting around the Earth or are launched into space. Obviously, it is important to know the position of satellites in space, but it is also essential to know their attitude, in other words their orientation with respect to an inertial coordinate system in the celestial dome.

A star sensor is an instrument that supplies its own attitude measurement calculated from direction measurements of stars that it carries out, or that directly transmits the list of measurements of elementary directions to a client device, for example such as the central software on a satellite on which the sensor is located.

FIG. 1 shows a satellite 1, for example in an orbit 2 around a planet 3, for example the Earth, at an altitude 13 above the planet surface. The satellite 1 comprises a star sensor 4 on one of its walls facing the stars in the celestial dome, and with a view field diagrammatically shown by the trunk of the cone 5. The circle 8 represents the part of the celestial dome observable in the view field 5. The stars 10 and 11 diagrammatically represent some of the stars that can be observed by the sensor 4. It can be understood that a plurality or a large number of stars can be observed at the same time within the circle 8. The stars 9 and 12 represent stars in the celestial dome outside the view field of the sensor.

The satellite 1 displaces in the orbit 2 along the arrow 6. Consequently, it can be understood that the circle 8 also displaces on the celestial dome along the arrow 7. Thus, the star 9 used to be in the circle 8, and the star 12 will be in the circle 8 in the future of the satellite displacement.

Most frequently, the attitude of the sensor 4 or the satellite 1 is calculated using only some of the stars present in the view field 8 of the star sensor 4. For example, about ten stars may be chosen to make an attitude calculation. The direction of the star 10 or 11 with respect to a coordinate system 15 related to the sensor 4 is measured in the attitude calculation. Since the direction of the star 10 or 11 with respect to a known inertial coordinate system 14 is also known, the direction of the coordinate system 15 (and therefore of the satellite 1 or the sensor 4) with respect to the coordinate system 14 of the celestial dome may be deduced.

The precision of the attitude estimate depends on the choice of stars to be measured for the direction calculation.

The choice of stars is also important when star direction measurements are transmitted directly and are used by the client device of the star sensor.

In some cases, the stars may be associated with a weight instead of being selected or rejected, which weights the importance to be assigned to them in subsequent processing.

In other cases, the star sensor itself makes a first selection of stars, makes measurements on these selected stars and may send them accompanied by a weight or transformed into a global attitude estimate.

The measurements may also originate from different star sensors onboard the same satellite.

In all cases, a selection is a set of potential or previously made measurements of star directions, for which the validity date is identical. As we have already said, weights may be associated with each measurement. Over time, a star sensor 4 generates a succession of selections, measurements being made on all or some of the selected stars.

Traditionally, stars chosen as being the best stars will be selected for as long as possible. In the early dates of stars sighting, it was difficult enough simply to lock onto a star. Therefore, once it was found it was not released.

One of the criteria for choosing stars in a selection is particularly the magnitude of each star that can be observed in the view field. Thus, the brightest stars should be chosen, namely stars with the lowest magnitude. One of the other selection criteria is the distance of the star from the optical axis of the view field. More precisely, FIG. 2 shows the circle 8 moving along the arrow 7 across the celestial dome. Choosing stars remote from the optical centre 83 and located within a reference area 81 within the circle 8 can improve the precision of the estimate depending on the optical axis 83 of the sensor. The axis 83 is the most likely to be affected by measurement errors. Stars located in an area reference 82 will be close to the optical axis 83 at one time or another and will provoke measurement errors. A star that is too close to the optical centre 83 will be rejected and another star further from the optical centre 83 will then be selected.

At the moment, selection methods give excessive importance to these two criteria, with the result that stars are not changed frequently.

However, the above methods have disadvantages.

Some stars, for which the direction is particularly badly estimated by sensor 4, disturb the global attitude estimate throughout the duration in which they are selected. This duration may be fairly long when the attitude of the star sensor 4 varies only slightly and when its view field is fairly wide. FIG. 3 diagrammatically shows such a situation. FIG. 3 shows the error on the attitude of the sensor 4 as a function of time. Changes 30 in the error level of the graph are due to star selection changes for determination of the attitude. It is seen that errors due to the choice of a selection are relatively long compared with the oscillations 31 on each plateau of the curve, which are due to observation errors of each star in the selection. It is observed that the errors 31 cancel out due to averaging over a relatively short time compared with the time during which each selection is observed. In other words, the noise due to oscillations 31 can easily be filtered by existing techniques for processing of data received from star sensors by client devices, since it is within the high frequencies of the frequency spectrum of the signal acquired by the sensor. The fact that the selection changes only infrequently results in low frequency noise that is difficult to filter.

More generally, methods of assigning a weighting coefficient according to prior art are incapable of controlling the noise dispersion with time due to each selection.

Furthermore, some phenomena (for example distortion) vary depending on the position of stars in each selection in the view field.

More generally, methods for assigning weighting coefficients according to prior art are incapable of controlling these space-time dispersion phenomena for stars to which high weights are assigned.

SUMMARY OF THE INVENTION

The invention proposes to overcome these disadvantages.

One of the purposes of the invention is to divulge a method for assignment of weighting or weighting coefficients for a calculation of a spatial orientation in order to control measurement errors of a star sensor.

Another purpose of the invention is to vary the dispersion of stars for which the direction measurements are used either by the star sensor itself or by the client device of the star sensor.

Another purpose of the invention is to propose a method of enabling space-time dispersion of star selections.

Finally, another purpose of the invention is to propose a method that is capable of taking account of previously made selections in order to spread low frequency noise related to star selections more or less throughout the spectrum.

To achieve this, the invention proposes a method for assignment of weighting coefficients to measurements of a succession of stars acquired by a star sensor related to a client device to determine a spatial orientation, characterised in that higher or lower preference is given to refreshment of the positions of measurements with the highest weights and/or stars on which these measurements are made by the star sensor and/or its client device, so as to displace part of the power of the error associated with the set of star measurements within the frequency spectrum.

This invention also advantageously includes the following characteristics, taken alone or in any technically possible combination: in the calculation of the weights of measurements in a current selection, the reinforcement or attenuation takes place as a result of applying a distance weight associated with each measurement in the current selection and characteristic of an average distance between firstly the said measurement and secondly the measurements in the previous selections and the other measurements in the current selection; the distance weight associated with the current selection measurement is calculated as a weighted average of the corresponding distances between firstly the said measurement, and secondly the previous selection measurements and the other measurements in the current selection respectively; the weighting coefficient associated with the distance between a first measurement in the current selection and a second measurement in a previous selection or another measurement in the current selection includes a memory coefficient associated with the said second measurement, and/or the weight of the second measurement if it belongs to a previous selection or a temporary weight if it belongs to the current selection; the distance calculation combines the angular distance between the two measurements, and an identity distance that depends on the difference in nature of the two stars for which the measurements are being made; the memory coefficient of a measurement $m_i$ at a time t is defined using the following formula:

$$\text{Mem}(m_i/t) = \mu \times \Pi^{-[t-T(m_i)]}, \text{ where}$$

$T(m_k)$ is a validity date of a measurement $m_k$ $\mu$ and $\Pi$ are constants.

A charge is assigned to each star for which a measurement is made, the charge summarising the weights assigned to the measurements made on the said star in the past, attenuated by the passage of time;

the charge of the star $e_p$ is defined at an instant T by the following formula:

$$Cha(e_p, T) = \sum_{\substack{i=P+1 \\ E(m_i)=e_p}}^{N} [A(m_i) \times Mem(m_i/T)]$$

where $Mem(m_i/T)$ is the memory coefficient of the measurement $m_i$ at time T, $E(m_i)$ is the star on which the measurement $m_i$ is made, and $A(m_i)$ is the measurement weight $m_i$;

the charge associated with a star to which a measurement in the current selection is related is updated before it is used in the calculation of the weight associated with a measurement, using a coefficient that depends on the difference $\Delta$ between the current date and the last update date for this charge;

the coefficient may be a factor and is in the form $\Pi^{-\Delta}$, where $\Pi$ is a constant;

the coefficient may be additive and is in the form $-\rho \times \Delta$, where $\rho$ is a constant;

after calculating the weight associated with a measurement in the current selection, the charge associated with the star for which this measurement was made is updated;

the update is made by adding the weight associated with the measurement;

a random function is used in the calculation of the weights;

the calculation of the distance weight is iterated with a temporary weight for measurements in the current selection, the distance weight being used to calculate a new weight itself used to calculate a new distance weight and so on, until convergence towards a final weight;

the digital values of the method are saved in memory and processing means of the sensor and/or the client device;

the renewal rate of stars with a large weight is increased by increasing the frequency of measurements of the star sensor and/or the client device;

the dispersion of the complete new selection is used directly in the weights, using processing means related to the sensor and/or client device;

processing means related to the sensor and/or the client device comprising a neurone structure are used to directly affect dispersion in the weights.

The invention also relates to the device for implementing this method.

PRESENTATION OF THE FIGURES

Other characteristics, purposes and advantages of the invention will become clear from the following description that is purely illustrative and is in no way limitative, and that should be read with reference to the attached drawings in which:

FIG. 1, already commented upon, diagrammatically shows an artificial satellite in orbit about a planet, and comprising a star sensor;

FIG. 2, already commented upon, diagrammatically shows a view field of a star sensor on the celestial dome;

FIG. 3, already commented upon, diagrammatically shows a graph of the error on the attitude as a function of time in methods for assignment of weighting coefficients according to the state of the art;

FIG. 4 diagrammatically shows a graph of the error on the attitude as a function of time in a method for the assignment of weighting coefficients according to the invention;

DETAILED DESCRIPTION OF THE INVENTION

Figure 1:
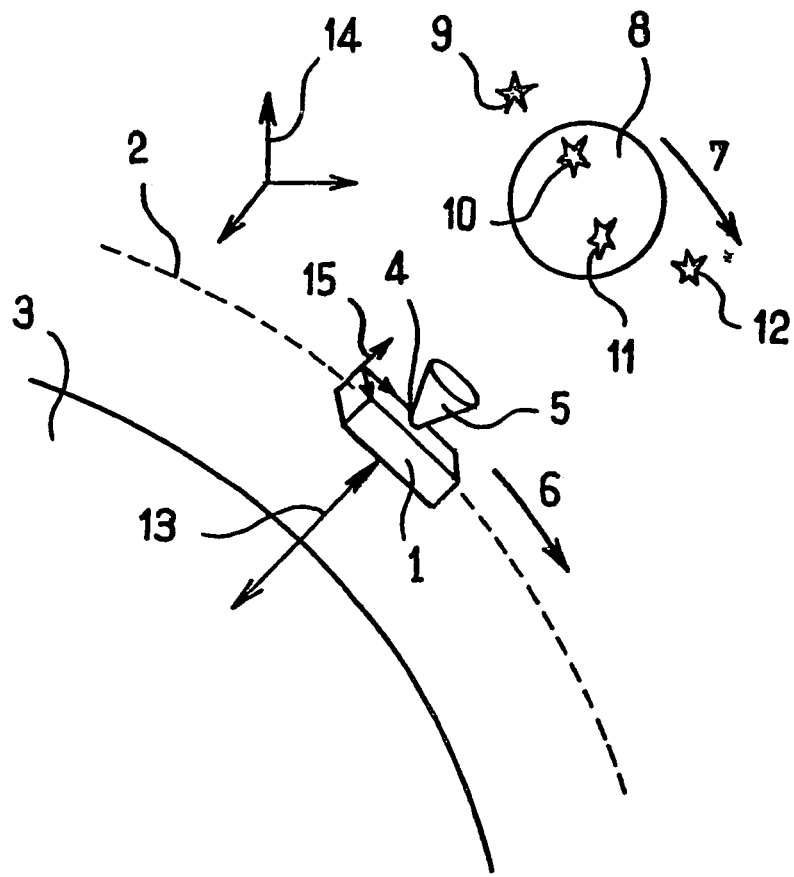
Figure 2:
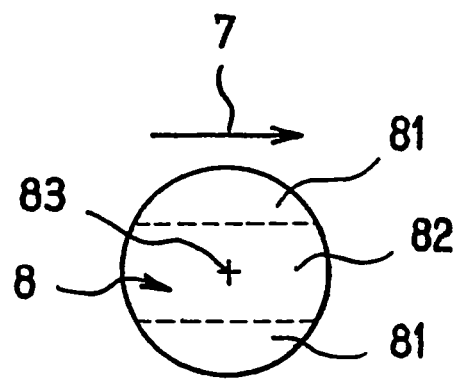

In some of its calculation phases, a star sensor 4 shown in FIG. 1 chooses to select specific stars (10 and 11 on FIG. 1) that it detects within its view field 8, either to use it itself in the calculation of the attitude, or to transmit the measurement of its direction directly to the client device, for example the satellite 1.

The selection then involves the assignment of a weight to each star 10 and 11 that characterises the potential of the star with respect to the needs of the client device 1 of the star sensor 4.

According to other methods, the stars are used in the calculation of the attitude with weighting, or a weight is transmitted to the client device 1 with the measurement of the star direction. All stars may then be transmitted, and a star transmitted with a zero weight is equivalent to an unselected star.

In any case, a weight is associated with a measurement of a star direction at one time or another. This weight characterises the potential of the measurement to satisfy the needs of the client device 1 of the star sensor 4.

We will now describe a first possible method for assigning weighting coefficients to measurements of a succession of stars acquired with a star sensor in order to determine a spatial orientation. According to this first method, the weights are assigned to the measurements individually.

According to a first method, the importance assigned to measurements is controlled as a function of whether or not they relate to new stars, which may be called the time dispersion of star measurements. It takes account of previous selections. The dispersion effect of measurements is amplified.

Figure 3:
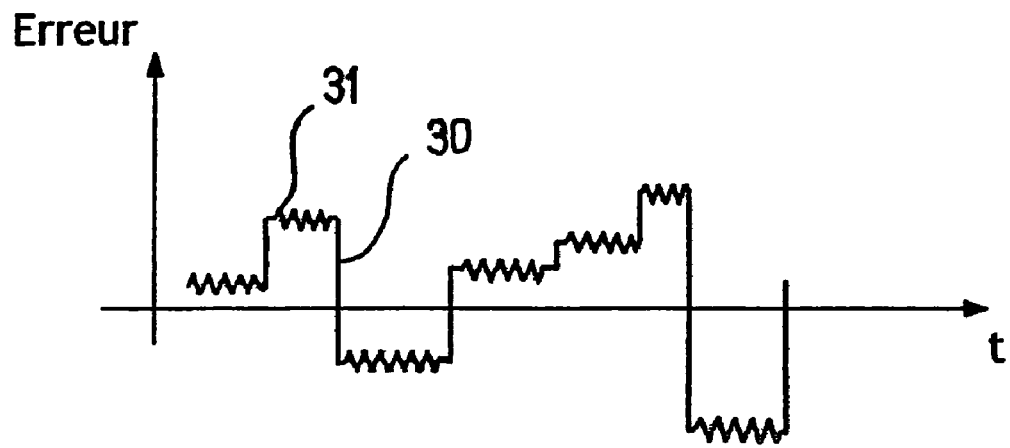
Figure 4:
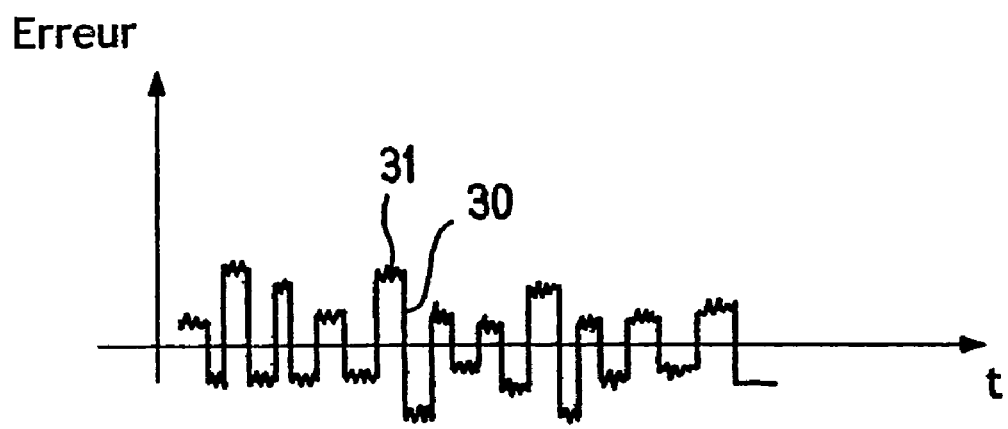
Figure 5:
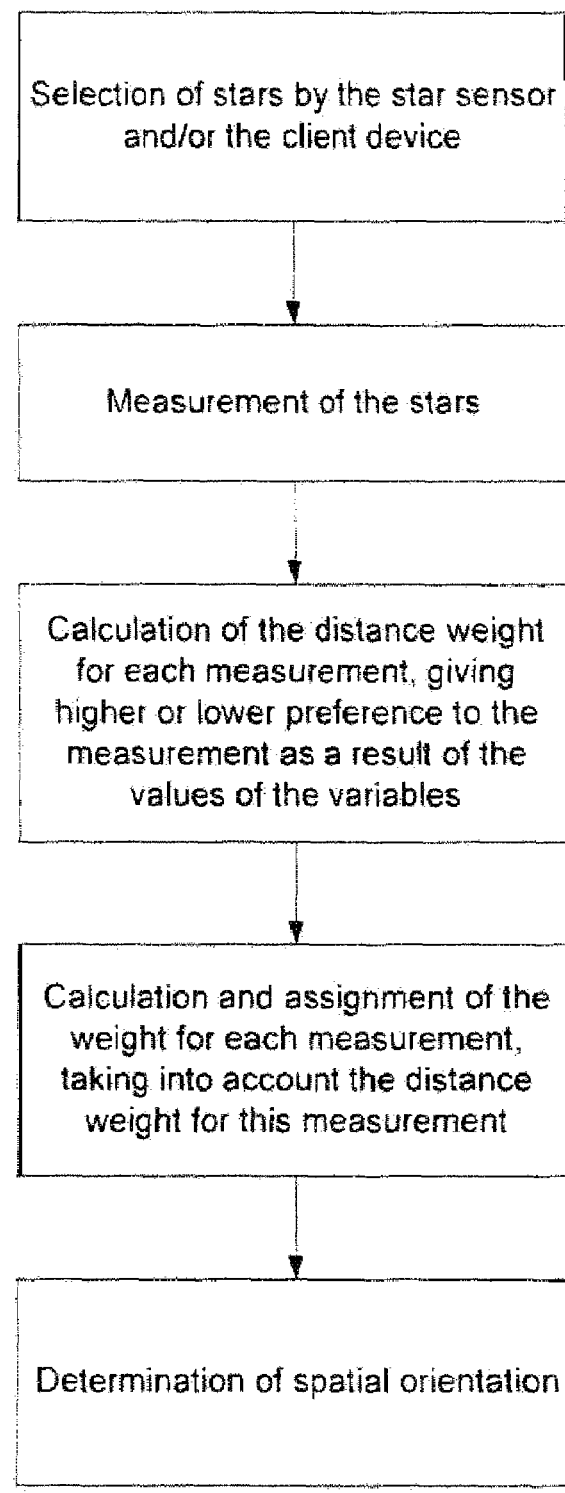
FIG. 5 is a flow diagram in accordance with an aspect of the technology.
Figure 6:
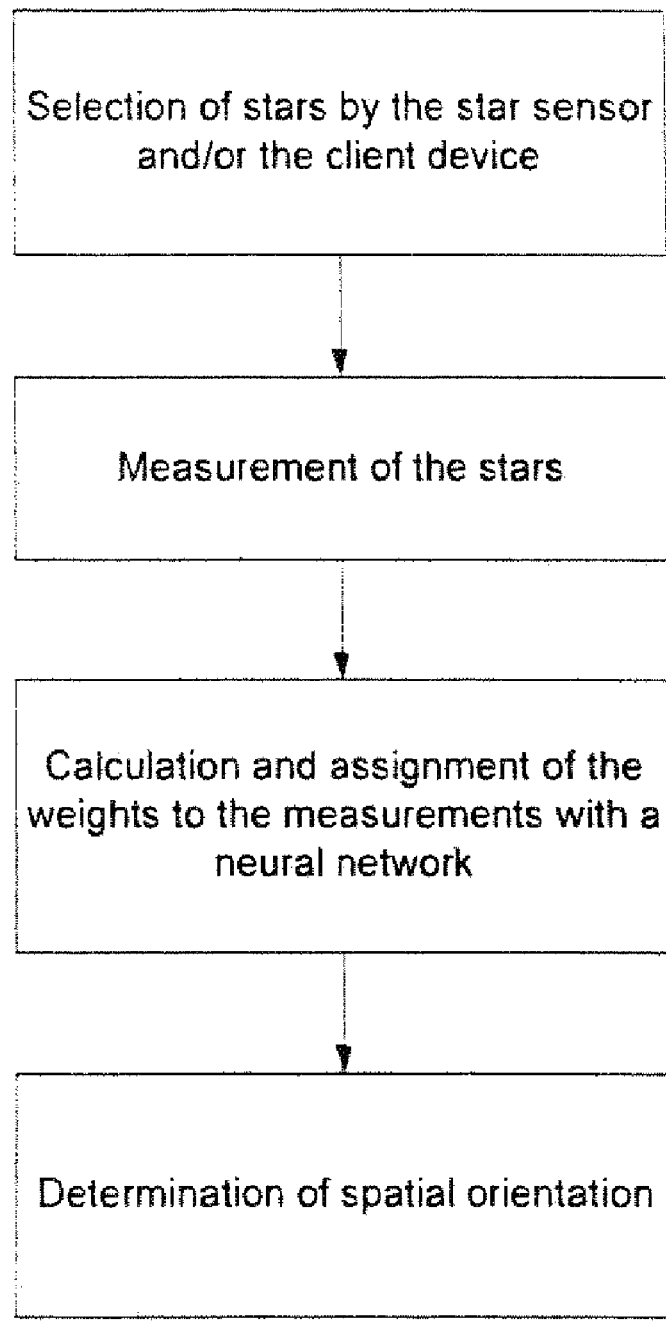
FIG. 6 is a flow diagram in accordance with an aspect of the technology.

According to a first possible embodiment, the consecutive duration during which a particular star is selected is reduced during observation of the stars. The effects of such a situation are shown diagrammatically in FIG. 4. Thus, the error on the attitude of the sensor 4 in FIG. 1 as a function of time is plotted in FIG. 4. As in FIG. 3, the changes 30 in the error level on the graph are due to changes in star selections made to determine the attitude. It is found that the errors due to the choice of a selection are relatively shorter than the errors in FIG. 3. They are of the same order of magnitude as the errors 31 due to observation errors of each star in the selection. In terms of the spectrum, a higher frequency of changing the star selection is equivalent to replacing low frequency noise (induced by stars made noisy by oscillations 31 and kept for a long time) by higher frequency noise (induced by a more frequent change of stars used in the attitude estimate). More precisely, this is equivalent to spreading the power at very low frequency within a wider frequency range. This operation may be particularly interesting if the client device of the star sensor has higher frequency measurement capabilities (which is the case when it uses high performance gyroscopes). Noise can be easily filtered.

Conversely, it can be understood that if high frequency filtering capabilities of the client device are weak, and if the high frequency noise is bothersome, it may be useful to give preference to low frequencies, by keeping each star for a longer period. Therefore, there will be a mode for using the method controlling a different dispersion of measurements in time.

According to another possible method according to the invention, the dispersion of star measurements in space will be controlled.

According to a first possible embodiment, when stars are being observed, the selected stars are geometrically dispersed in the view field. This controls measurement distortion. This dispersion relates to a selection made at a given instant.

It can also be understood that according to another embodiment, it is required to not disperse the measurements in space.

Space—time dispersion of measurements will be combined to control the error due to each selection in the orientation calculation.

Consequently, in calculating the weight associated with a measurement, the invention uses the average distance of the corresponding measurement with measurements in previous selections and the present selection. If it is required that the measurements to which a high weight is assigned should last for a long time, then an attempt will be made to minimise this average distance. On the other hand, an attempt will be made to maximise the distance if it is required that the measurements should be renewed frequently.

A "distance weight" means an average distance of a measurement with measurements in previous and present selections. The distance weight is then used in the calculation of the weight, which takes account of other considerations (for example the position of the measurement on the view field or the magnitude of the star considered). One possible expression of the distance weight is given in the remainder of this description. The first step is to define some of its possible variables.

Let $\{m_1, m_2, \ldots m_N\}$ be the series of measurements of previous and present star directions. Two distinct elements in this sequence may correspond to the same physical star measured at two different instants.

The sub-series $\{m_1, m_2, \ldots m_P\}$, where $P \leq N$, is the series of stars in the present selection.

$\delta(m_i, m_j)$ characterises the difference between measurements $m_i$ and $m_j$ and uses two terms with very different natures, for example by their product:

$DA(m_i, m_j)$—this is the angular difference in the coordinate system of the star sensor 4 (or any other corresponding distance, for example the geometric distance on the detection matrix of the same sensor). Characterising this angular difference provides a means of dispersing or grouping measurements that will be assigned a high weight on the sensor matrix. For example, this provides a means of compensating for some optical distortion errors.

$DE(m_i, m_j)$—this is the identity difference, in other words the difference in characteristics of stars for which two measurements are made. For example, this difference may be equal to 0 if the two stars are identical, and otherwise to a positive value (two measurements corresponding to identical stars can give different values of the distance DA, due to movement of the star sensor along the direction 6 in FIG. 1). Characterising this distance makes it possible to replace stars for which measurements are made more or less frequently. This also provides a means of giving preference to stars that have spectra or magnitudes that are different from (or similar to) previously selected stars.

One possibility consists of using the identity difference to characterise the difference between the current measurement and measurements made in previous selections, and using the angular difference to characterise differences between measurements in the current selection.

The distance may possibly be a function of one or both of the previous distances. If the function is decreasing both as a function of DA and DE, a proximity weight will be calculated instead of a distance weight. This will then be used in the formula for calculating the weight instead of or in addition to the distance weight.

For example, we will choose $\delta(m_i, m_j) = q \times (e^{DA(m_j, m_i)} - 1) \times DE(m_j, m_i)$, where q is a constant, $DA(m_i, m_j)$ is the angular distance between the two measurements, and $DE(m_i, m_j)$ is equal to 0 if the stars for which the two measurements were made are identical, and otherwise 1. Therefore, $\delta(m_i, m_j)$ is not zero only if the stars are different.

The previously calculated weight $A(m_i)$, which in particular uses the distance weight, is associated with each measurement $m_i$ in previous selections.

The weight of previous measurements used in the calculation of the distance weight corresponding to a measurement $m_j$ of the current selection is reduced, because time has erased the memory of this measurement. The result of this reduction is the remanent weight.

The remanent weight may be calculated as being the product of the weight and a memory coefficient $Mem(m_i/t)$ that characterises the stored memory of the measurement $m_i$ at date t. The measurement memory coefficient $m_i$ for the measurement $m_j$ at date $T(m_j)$ is written as $Mem(m_i/T(m_j))$.

The memory coefficient $Mem(m_i/t)$ decreases when the measurement $m_i$ becomes more remote in time. This reflects the gradual erasure of star measurements from memory.

For example, the following product will be used:

$Mem(m_i/t) = \mu \times \Pi^{-[t-T(mi)]}$; where $T(m_k)$ is the validity date of measurement $m_k$
$\mu$ and $\Pi$ are constants.

The values of constants may depend on the difference $\delta(m_i, m_j)$. Thus, by varying $\mu$, the memory coefficient may change to the value 0 when $[t-T(m_i)]$ exceeds a certain value. This erases the memory of the measurement. The coefficient may also change to the value 0 when $[t-T(m_i)]$ is less than a certain value. This provides a means of forcing the selection of stars present in very recent selections. It also provides a means of excluding the distance weight of measurements in the current selection from the formula.

The distance weight associated with the measurement $m_j$ is an average over the set of measurements in previous selections and measurements in the current selection (except $m_j$).

The average may be weighted by remanent weights of measurements used in the average.

For example, the average will be calculated in the following form:

$$P(m_j) = \left[ \frac{\sum_{\substack{i=1 \\ i \neq j}}^{N} [A(m_i) \times Mem(m_i/T(m_j))]^\Omega \times \delta(m_j, m_i)^\varphi}{\sum_{\substack{i=1 \\ i \neq j}}^{N} [A(m_i) \times Mem(m_i/T(m_j))]^\Omega} \right]^{1/\varphi} ;$$

where
and $\varphi$ are constants. If $\Omega$ and $\varphi$ are equal to 1, then it is a linear average of the distances. If $\varphi$ is equal to 2, it is a root mean square of the same distances (in principle $\Omega$ is equal to 1). If $\varphi < 1$, the separation between pairs of very close measurement is accentuated.

If the measurement $m_j$ is included in the present selection, the weight $A(m_j)$ will not use the distance weight.

In practice, the weight of a measurement in the current selection may be calculated from an arbitrary distance weight. An iterative method may be used after this first calculation: weights associated with these measurements in the current selection are used in the calculation of distance weights for these measurements, and take account of the distance weight calculated in the previous iteration. All distance weights of measurements in the current selection are thus recalculated until they converge.

Another possibility consists of not using the other measurements in the current selection in the calculation of the distance weights of the current selection. This is equivalent to choosing $Mem(m_i/t) = 0$ for all values of i such that $m_i$ is a measurement in the current selection.

The calculation of the distance weight can give a weight for each star measurement.

For example, the weight may be calculated as $A(m_j) = e^{-M} \times \Psi(m_j) \times P(m_j)$, where M is the magnitude of the star for which the measurement $m_j$ is made, $\Psi(m_j)$ is the angular distance between the measurement $m_j$ and the optical axis of the star sensor, and $P(m_j)$ is the distance weight associated with the measurement $m_j$.

Thus, the stars with the greatest weights are given preference in a selection.

It can then be understood that the space—time dispersion of selections is controlled by varying the different distance weight variables, which results in a different final weight to the measurements. The selections may be change more or less quickly, and the selections are more or less dispersed among themselves on the matrix of the sensor, as a function of the parameters of the chosen variables.

We will now describe a variant of the method in which the distance weight of the measurements in previous selections is calculated recursively, to limit the amount of information to be memorised and to simplify the calculations.

In this variant of the method, the identity distance is used to define proximity between measurements.

Depending on the variant of the method, the information that summarises the past characterises the stars on which the measurements in previous selections were made, rather than the measurements themselves directly. This information can be summarised as a pair $C_p$ associated with each star $e_p$, for which the measurement formed part of a previous selection defined by:

$C_p = \{Cha, date\}$, where date is the validity date of the charge Cha, which varies with time. The charge Cha is the accumulation of remanent weights associated with the set of measurements at the instant considered, that in previous selections applied to star $e_p$. Therefore the charge associated with star $e_p$ at time T is theoretically defined as follows, using the same notations as above and if $E(m_i)$ is the star to which the measurement $m_i$ applied:

$$Cha(e_p, T) = \sum_{\substack{i=P+1 \\ E(m_i) = e_p}}^{N} [A(m_i) \times Mem(m_i/T)]$$

The term inside the sum can be multiplied by a function of the angular distance between the current measurement applied to star $e_p$ and the measurement $m_i$, to take account of the spatial dispersion between successive selections (the target area in the sky possibly changing under the effect of the movement of the satellite). For example, this function may be in the following form:

$$e^{-\eta \times d(m(e_p), m_i)}$$

where $m(e_p)$ is the measurement in the current selection applicable to star p, d is the distance between the two measurements in the argument and $\eta$ is a coefficient.

Instead of a charge, a memory associated with the star may be calculated equal to the average of the memory coefficients associated with the measurements that applied to the star considered weighted by their weights, for example:

$$SOU(e_p, T) = \frac{\sum_{\substack{i=1 \\ E(m_i)=e_p}}^{N} [A(m_i) \times Mem(m_i/T)]}{\sum_{\substack{i=1 \\ E(m_i)=e_p}}^{N} A(m_i)}$$

This memory is a "normalised charge" that will be used in the calculation of the weight.

Charges are propagated as follows at the time that the measurements in the current selection are processed.

Charges are refreshed and associated dates are updated. Charges associated with stars that form part of previous selections are diminished to translate erasure from memory. This update may possibly concern only stars in the current selection, but all information related to other stars must be kept. Charges associated with stars that do not form part of any previous selection remain zero. Dates associated with charges of stars in previous selections change to the date of the current selection.

This reduction in the charge may be made if $\Delta$ is the time difference defined as follows:

$\Delta$=current selection date−date previously associated with the charge, by using one of the following two methods:
  1. multiplication of a previous charge by a factor:
     $\Pi^{-\Delta}$, where $\Pi$ is a constant
  2. addition of a factor to the previous charge:
     $-\rho \times \Delta$, where $\rho$ is a constant.

The charge thus obtained is forced to 0 if the result of the previous operation is negative.

The charge is calculated without approximation when the previous method has been chosen and the memory coefficient is also in exponential form. In other cases, the calculation is approximate.

The next step is to assign distance weights. The distance weight assigned to each measurement in the current selection is equal to the refreshed charge associated with the star for which the measurement considered is made. If no previous measurements were made for the star, its initial charge is zero and therefore its distance weight will also be zero.

The next step is to calculate the weights. The distance weights calculated in the previous step are used to calculate weights associated with measurements in the current selection, for example using the formula $A(m_j) = e^{-M} \times \psi(m_j) \times P(m_j)$.

The charges are then updated. Charges of stars to which measurements in the current selection are made are increased by the value of the corresponding measurement weights. For each star $e_h$ that was not previously characterised by a pair $C_h = \{Cha, date\}$, the date is fixed at the current selection date. For all stars concerned, the date may be assigned in this step rather than in the charge refreshment step.

Finally, charges that are too small are eliminated. This step is optional. Charges below a minimum value may be eliminated, which is equivalent to forgetting that at least one selection was made on the star in the past.

A random function, for example a random Gaussian or uniform variable may be used for calculating the weights. This contributes to space—time dispersion of stars, in this case by chance.

The distance weight or the charge pair is calculated assuming that information is memorised about measurements in previous selections, for example chosen from the following for each measurement:
  The measurement date,
  The weight finally assigned to the measurement,
  The direction of the measurement, identified by its angle in a coordinate system 15 related to the sensor 4, or by vector in a coordinate system related to its matrix,
  Some characteristics of the star used to make the measurement.

If the recursive method is used, the pair $C_p = \{Cha, date\}$ is kept for each star for which a set of measurements was made for which the memory was not erased.

Therefore, memory and processing means are associated with the sensor and/or its client device, namely the satellite.

If the available memory limit is reached, information about measurements for which the memory is weakest can be deleted. The criterion can apply to:
  the product of the memory associated with the measurement by the weight of the same measurement;
  the charge, particularly if the recursive method is used.

We will now describe a second possible method for assigning weighting coefficients to measurements of a succession of stars acquired by a star sensor in order to determine a spatial orientation. According to this second method, the best selection of stars for determining the spatial orientation will be chosen directly. We will no longer consider stars individually to determine which have the greatest coefficients before grouping them in selections. The dispersion of a complete new selection will be used directly in the weights, using processing means connected to the renewal rate of stars with a large weight is increased by increasing the frequency of measurements of the star sensor and/or the client device;

According to this method, the processing means connected to the sensor may comprise a neural network. The neural network can assign weights to stars to determine the orientation of the sensor or the satellite, for example after a learning process. The learning criterion on the neural network can use distance coefficients, average distances, charges and/or memory defined above. It may also use the average of distance weights, possibly weighted by the weights of stars (or by temporary weights that do not take account of distance weights) for the stars in a selection.

In both methods, the selected star dispersion phenomenon may be amplified by forcing the star sensor to operate at a frequency higher than is strictly necessary. Provided that the previous methods are used, the number of selections used will be increased, causing additional spreading of noise on the spectrum. The advantages thus obtained could compensate the increase in noise induced by shortening of the integration of light information by the star sensor, from the point of view of the client device in the star sensor.

Star measurements can then be filtered and then subsampled before use, to return to the required frequency. In principle, filtering involves the calculation of the attitude quaternion. The method is efficient even if the previous and proximity weights are not used in the criterion.

The above developments are equally applicable firstly to a star set detected and selected regularly (for example once every second), at the same time (as is the case for conventional operation of a star sensor with a CCD detector), or secondly to a star set in which the stars are detected irregularly (use of new types of detectors) and in which selections are produced irregularly (as is the case for APS (Active Pixel Sensor) star sensors.

The methods may be used at several levels, possibly simultaneously, for example the selection level of the stars on which the stellar sensor(s) will make their measurements; weighting of measurements made at the star sensor(s); weighting of measurements made at the measurements client device.

The invention claimed is:

1. A computer-implemented method of assigning weights to measurements of a selection of stars, the measurements being acquired by a star sensor connected to a client device, in order to determine a spatial orientation, the method comprising the steps of giving higher or lower preference to refreshment, by at least one or both of the star sensor and its client device, of at least one or both of
    (a) a position of the measurements with the highest weights and
    (b) the stars on which these measurements are made, so as to displace, within a frequency spectrum, a part of a power of an error associated with the measurements of the selection of stars.

2. The method according to claim 1, wherein in a calculation of the weights of the measurements in a current selection of stars, the higher or lower preference takes place as a result of applying a distance weight
    associated with each measurement in the current selection and
    characteristic of an average distance between
    on the one hand said measurement and
    on the other hand the measurements for previous selections of stars and other measurements in the current selection of stars.

3. The method according to claim 2, wherein the distance weight associated with each measurement in the current selection is calculated as a weighted average of distances, each distance corresponding to the distance between
    on the one hand a first measurement corresponding to said measurement, in the current selection of stars and
    on the other hand a second measurement, each second measurement being respectively the measurements for previous selections of stars or other measurements in the current selection.

4. The method according to claim 3, wherein the distance weight associated with a distance between
    a first measurement in the current selection and
    a second measurement in a previous selection stars or another measurement in the current selection of stairs, includes
    (a) a memory coefficient associated with the said second measurement, and
    (b) the weight of the second measurement if the second measurement belongs to a previous selection of stars, or a temporary weight if the second measurement belongs to the current selection of stars.

5. The method according to claim 3, wherein the distance weight is calculated by combining
    an angular distance between the first measurement and the second measurement, and
    an identity distance that depends on the difference in nature of two stars for which the first measurement and the second measurement are being made.

6. The method according to claim 4, wherein a memory coefficient Mem of a measurement $m_i$ at time t is defined using the following formula:

$$\mathrm{Mem}(m_i/t) = \mu \times \Pi^{-[t-T(m_i)]}, \text{ where}$$

$T(m_k)$ is a validity date of a measurement $m_k$ $\mu$ and $\Pi$ are constants.

7. The method according to claim 2, wherein a charge Cha is assigned to each star for which a measurement is made, the charge Cha summarising the weights assigned to the measurements made on the said star in the past, attenuated by time.

8. The method according to claim 7, wherein the charge Cha of a star $e_p$ is defined at an instant T by the following formula:

$$Cha(e_p, T) = \sum_{\substack{i=P+1 \\ E(m_i)=e_p}}^{N} [A(m_i) \times Mem(m_i/T)]$$

where $Mem(m_i/T)$ is a memory coefficient of a measurement $m_i$ at time T, $E(m_i)$ is a star on which the measurement $m_i$ is made, and $A(m_i)$ is the weight of the measurement $m_i$.

9. The method according to claim 7, wherein the charge Cha, associated with a star for which a measurement in the current selection is made, is updated before it is used in the calculation of the weight associated with the said measurement, the update being made using a coefficient that depends on a difference $\Delta$ between a current date and a date of a previous update for the said charge Cha.

10. The method according to claim 9, wherein the update of the charge Cha is made by multiplying the previous update of the charge Cha by a coefficient $\Pi^{-\Delta}$, where $\Pi$ is a constant.

11. The method according to claim 9, wherein the update of the charge Cha is made by adding a coefficient $-\rho \times \Delta$ where $\rho$ is a constant, to the previous update of the charge Cha.

12. The method according to claim 7, wherein, after calculating the weight associated with a measurement in the current selection, the charge Cha associated with the star for which this measurement was made, is updated.

13. The method according to claim 12, wherein the update of the charge Cha is made by adding the weight associated with the measurement.

14. The method according to claim 2, wherein a random Gaussian variable is used in the calculation of the weights.

15. The method according to claim 2, wherein the calculation of the distance weight is iterated with a temporary weight associated with measurements in the current selection, the distance weight being used to calculate the temporary weight used to calculate a new distance weight, the iterations being made until convergence towards a final distance weight.

16. The method according to claim 2, wherein a random uniform variable is used in the calculation of the weights.

17. The method according to claim 1, wherein giving higher preference to refreshment of stars with a high weight is made by increasing a frequency of measurements of the star sensor and/or the client device.

18. The method according to claim 1, wherein a dispersion of a complete new selection is used directly in the weights, using processing means related to the sensor and/or client device.

19. The method according to claim 18, wherein the processing means related to the sensor and/or the client device comprise a neural network.

* * * * *

UNITED STATES PATENT AND TRADEMARK OFFICE
CERTIFICATE OF CORRECTION

PATENT NO. : 7,676,305 B2
APPLICATION NO. : 10/549737
DATED : March 9, 2010
INVENTOR(S) : Serge Potteck It is certified that error appears in the above-identified patent and that said Letters Patent is hereby corrected as shown below:

Column 4, line 52, "neurone structure" should read --neural network--
Column 11, line 54, "selection stars" should read --selection of stars--
Column 11, line 55, delete "stairs" and insert --stars--

Signed and Sealed this

Twenty-ninth Day of June, 2010

David J. Kappos
*Director of the United States Patent and Trademark Office*